United States Patent Office 3,794,666
Patented Feb. 26, 1974

3,794,666
PROCESS FOR PRODUCING 3,3-BIS(p-DIMETHYL-AMINO-PHENYL)-4,5,6 OR 7 DIMETHYLAMINO-PHTHALIDE
Seiji Hotto, Hirakata, Hideki Yanagihara, Takatsuki, and Takashi Akamatsu, Ashiya, Japan, assignors to Sumitomo Chemical Company, Ltd., Osaka, Japan
No Drawing. Filed Apr. 7, 1970, Ser. No. 26,420
Int. Cl. C07d 5/32
U.S. Cl. 260—343.3   8 Claims

ABSTRACT OF THE DISCLOSURE

An improved process for the production of so-called crystal violet lactone having the formula,

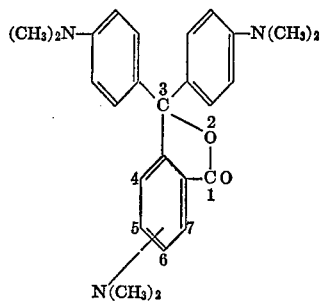

which comprises reacting a mixture of formaldehyde and a compound having the formula,

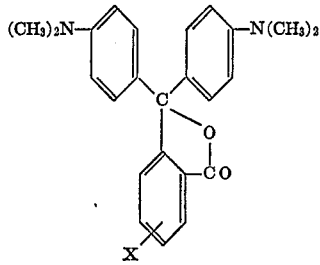

wherein X is nitro or amino group, in an inert solvent, with hydrogen in the presence of a catalyst for the catalytic reduction, if desired in the presence of an acid. The crystal violet lactone is useful for the production of pressure-sensitive copy paper.

---

The present invention relates to a process for producing materials for pressure-sensitive copy paper which has recently become more important with the rationalization of office work, and more particularly relates to an improved process for the production of 3,3-bis (p-dimethylaminophenyl) 4,5,6 or 7-dimethylaminophthalide, that is, so-called crystal violet lactone, represented by the formula,

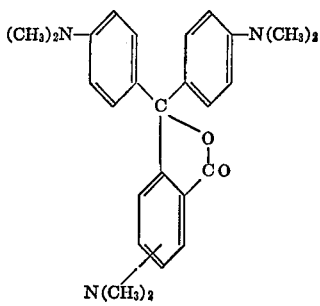

As a process for the production of the crystal violet lactone, for example, U.S. patent specification Nos. 2,417,-897 and 2,458,328 disclose a process which comprises the condensation and oxidation of m-dimethylaminobenzoic acid and Michler's hydrol. Also, "Kogyo Kagaku Zasshi," vol. 64, pages 1226 to 1230 discloses a process which comprises the condensation of dimethylaminophthalic anhydride and dimethylaniline. However, both the processes cannot be carried out without long and complicated operations and low yield. They can not be commercially practical processes.

Further, "Kogyo Kagaku Zasshi," vol. 67, pages 1050 to 1058 discloses the reduction of nitro malachite green lactone having the formula,

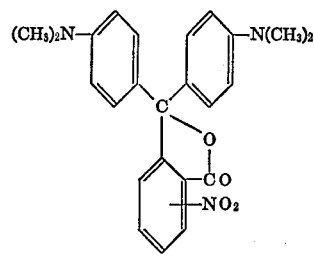

and alkylation of thus obtained amino malachite green lactone having the formula,

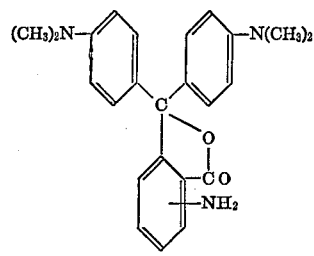

to obtain a crystal violet lactone analogue. However, it has been confirmed that the crystal violet lactone content of the product produced by this process is at most several percent and that the product consists mainly of the monomethyl compound and the unreacted amino compound.

It is therefore the principal object of the present invention to avoid the difficulties heretofore encountered in the prior art processes.

It is a further object to provide a method of producing crystal violet lactone which is not only simple but also produces a product of high purity.

Another object of the present invention is to provide an improved method for the production of crystal violet lactone.

Another object of the invention is the provision of a process for producing highly pure crystal violet lactone in a commercially feasible manner.

These and other objects of the present invention may be accomplished by the provision of a process for producing the crystal violet lactone (I) which comprises reacting a mixture of formaldehyde and a compound represented by the formula,

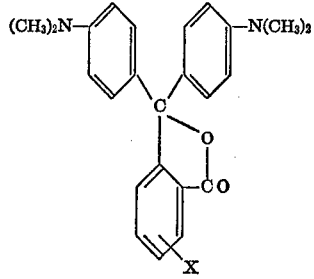

wherein X is nitro or amino group, in an inert solvent, with hydrogen gas in the presence of a catalyst for the catalytic reduction, if desired in the presence of an acid, and if necessary oxidizing the resulting compound with a suitable oxidizing agent.

The compound represented by the Formula II which may be used as the starting material in the present invention can be produced, for example, by a method as described in "Kogyo Kagaku Zasshi," vol. 67, pages 1052 to 1053. The position of the nitro or amino group may be any one of 4-, 5-, 6- and 7-positions, or a mixture of these isomers may be used.

The inert solvents which may be used in the reductive alkylation include alcohols, lower aliphatic carboxylic acids, dioxane, tetrahydrofuran and ethylene glycol monoalkyl ethers which are used in ordinary hydrogenation process.

The catalysts for catalytic reduction which may be used in the present invention include platinum catalysts, palladium catalysts and nickel catalysts. These catalysts may be used in such a suitable form, if necessary, a sponge catalysts, black catalysts, colloid catalysts, supported catalysts and skeleton catalysts.

The formaldehyde source is advantageously formalin, but formaldehyde polymers such as trioxane or paraformaldehyde may be also used.

The acids which may be optionally added in the present invention include sulfuric acid, phosphoric acid, organic carboxylic acids, organic sulfonic acids, etc. When lower aliphatic carboxylic acids are employed as the inert solvent, it is not always necessary to add another acid mentioned above.

According to an embodiment of the present invention, two mols or more of formaldehyde and optionally not more than 5 mols of the above-mentioned acid are added to one mol of the compound represented by the Formula II in an inert solvent in the presence of the catalyst for catalytic reduction, and reductive alkylation is effected at a temperature from 0° to 150° C. under normal or increased pressure.

The reaction product thus obtained is generally a mixture of crystal violet lactone and 2-(4,4'-bis-dimethylaminobenzohydryl)-3,4,5 or 6 - dimethylaminobenzoic acid, that is, so-called leuco crystal violet lactone represented by the formula,

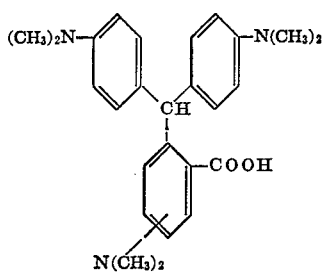

The ratio of the two compounds varies depending upon the reaction condition. Generally, the amount of the leuco, compound increases at higher temperatures under higher pressure.

The mixture of crystal violet lactone and its leuco compound is, if desired, oxidized, in the form of the reaction liquid itself or after the mixture is recovered and dissolved in an inert solvent such as alcohols, with a conventional oxidizing agent such as, for example, lead peroxide, potassium permanganate or chloranil.

Thus, the crystal violet lactone having high purity is obtained in a high yield.

The crystal violet lactone thus obtained can be effectively used as material for pressure-sensitive copy paper giving a highly brillant blue shade.

The following examples illustrate the process of the present invention, but are not intended to limit the scope of the present invention. In the examples all parts are expressed by weight, unless otherwise indicated.

EXAMPLE 1

Into an autoclave 250 parts by volume of ethylene glycol monomethyl ether, 20.9 parts of nitro malachite green lactone, 17.7 parts of 35% formalin, 25 parts of p-toluenesulfonic acid and 1.04 part of 5% palladium-carbon were charged. Hydrogen gas was introduced into the autoclave until the pressure reached 50 kg./cm.² The reaction mixture was stirred for 20 hours at room temperature (26° to 28° C.), whereupon the hydrogen pressure was reduced to 36 kg./cm.²

The temperature was raised to 100° C. at which the reaction mixture was stirred for 10 hours. After the mixture was cooled, the catalyst was filtered off. The filtrate was poured into 1500 parts of water and neutralized with sodium hydroxide. Thus, 20.5 parts of light brown crystals were obtained having a melting point of 170° to 180° C. The product consisted mainly of leuco crystal violet lactone.

To the solution of 15.0 parts of the obtained product in 100 parts by volume of ethylene glycol monomethyl ether, 8.9 parts of chloranil was added and the mixture was stirred at 50° C. for one hour. The reaction liquid was poured into 2,000 parts by volume of water. The pH of the mixture was adjusted to 2 or less by the addition of dilute hydrochloric acid. The insoluble matter was removed and sodium hydroxide was then added to the filtrate, whereupon pale blue crystals were separated.

Thus, 14.3 parts of crude crystal violet lactone was obtained.

The obtained product was sufficiently pure for use as material for pressure-sensitive copy paper without further purification, however the product was recrystallized from methyl isobutyl ketone with a decolorizing agent to obtain the product having the following physical properties.

Appearance: light yellow crystalline solid
Melting point: 175° C.
λ max (in acetic acid): 610 mµ

*Elementary analysis.*—Found (percent): C, 75.10; H, 7.01; N, 10.06. Calculated (percent): C, 75.15; H, 7.03; N, 10.11.

When 2.5 parts of Raney nickel was used in place of 1.04 part of 5% palladium-carbon, similar treatment gave the crystal violet lactone having similar physical properties.

EXAMPLE 2

To 50 parts of glacial acetic acid were added 4.2 parts of nitro malachite green lactone, 0.76 parts of paraformaldehyde and 0.2 part of 5% palladium-carbon. Hydrogen gas was introduced by use of a normal pressure reduction apparatus.

760 parts by volume of hydrogen gas was absorbed during 5 hours at room temperature. The reaction liquid gradually turned blue. The insoluble matter was filtered off. The filtrate was poured into 500 parts by volume of water and neutralized with a dilute aqueous solution of sodium hydroxide. Thus 3.9 parts of grey crystals were obtained which consisted mainly of crystal violet lactone.

Further, the product was then oxidized with chloranil in the same manner as in Example 1 to obtain crystal violet lactone having high purity.

EXAMPLE 3

In 30 parts by volume of isopropy alcohol, 2.1 parts of the product consisting mainly of leuco crystal violet lactone which was obtained in the former half of Example 1 was dissolved. To this solution 6 parts by volume of glacial acetic acid and 6 parts by volume of concentrated hydrochloric acid were added and the mixture was kept at 50° C. 1.2 part of lead peroxide was then added and the mixture was stirred at 50° to 52° C. for two hours. 0.8 part of sodium sulfate was added and the soluble matter was filtered off. The filtrate was poured into 300 parts by volume of water and neutralized with an alkali. Thus, 1.9 part of grey crystal violet lactone was obtained which had very high purity as the crystal violet lactone obtained in Example 1.

EXAMPLE 4

Into a magen were introduced 40 parts by volume of dioxane, 3.9 parts of amino malachite green lactone, 2.2 parts of 35% formalin, 4.3 parts of phosphoric acid and 0.2 part of 5% palladium-carbon. Hydrogen gas was then introduced by use of a normal pressure reduction apparatus and the whole was shaken for 12 hours. 490 parts by volume of hydrogen was consumed.

The catalyst was filtered off. To the filtrate 1.7 part of chloranil was added and the mixture was maintained at 50° C. for two hours. The reaction liquid was poured into 500 parts by volume of water. The pH of the mixture was adjusted to 2 or less by the addition of dilute hydrochloric acid. The insoluble matter was filtered off and the filtrate was neutralized with a dilute aqueous solution of caustic soda, whereupon grey crystals were separated by filtration and dried to obtain 4.1 parts of crystal violet lactone.

What we claim is:

1. A process for producing 3,3-bis-(p-dimethylaminophenyl)-4,5,6 or 7-dimethylaminophthalide having the formula,

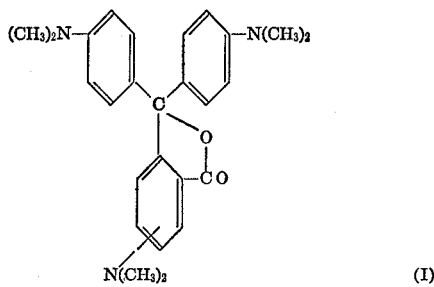

(I)

which comprises reacting a mixture of formaldehyde and a compound having the formula,

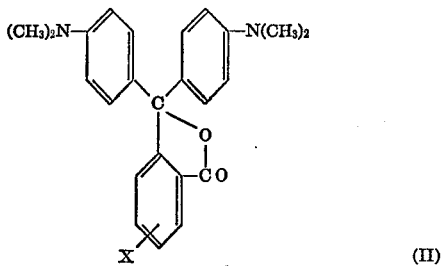

(II)

wherein X is nitro or amino group, in an inert solvent, with hydrogen gas in the presence of a catalyst for the catalytic reduction, if desired in the presence of an acid.

2. A process for producing 3,3-bis-(p-dimethylaminophenyl)-4,5,6 or 7-dimethylaminophthalide having the formula,

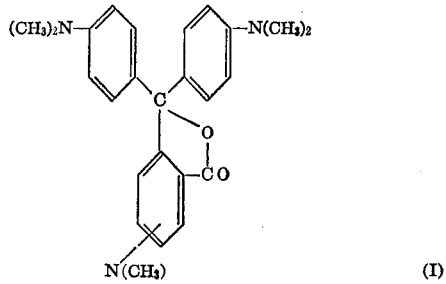

(I)

which comprises reacting a mixture of formaldehyde and a compound having the formula,

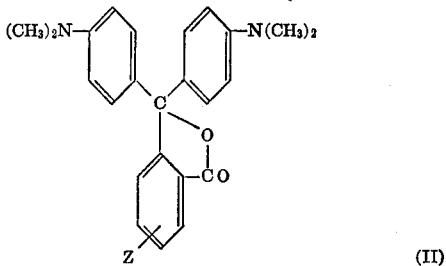

(II)

wherein X is nitro or amino group, in an inert solvent, with hydrogen gas in the presence of a catalyst for the catalytic reduction, if desired in the presence of an acid and, if desired, treating the resulting product with an oxidizing agent.

3. A process according to claim 1, wherein said catalyst for catalytic reduction is a member selected from the group consisting of platinum catalysts, palladium catalysts and nickel catalysts.

4. A process according to claim 1, wherein said formaldehyde is a member selected from the group consisting of formalin, trioxane and paraformaldehyde.

5. A process according to claim 1, wherein said inert solvent is a member selected from the group consisting of alcohols, lower aliphatic carboxylic acids, dioxane, tetrahydrofuran and ethylene glycol monoalkyl ethers.

6. A process according to claim 1, wherein said acid is a member selected from the group consisting of sulfuric acid, phosphoric acid, organic carboxylic acids and organic sulfonic acids.

7. A process according to claim 1, wherein the amount of formaldehyde is two or more mols per mol of the compound having the Formula II.

8. A process according to claim 2, wherein said oxidizing agent is a member selected from the group consisting of lead peroxide, potassium permanganate and chloranil.

References Cited
UNITED STATES PATENTS 3,244,549  4/1966  Farnham et al. _____ 117—36.2
3,244,728  4/1966  Johnson et al. _____ 117—36.2

OTHER REFERENCES

Wagner et al.: Synthetic Organic Chemistry, John Wiley & Sons, 1953, N.Y. (pp. 662–663).

ALEX MAZEL, Primary Examiner

A. M. T. TIHE, Assistant Examiner